No. 728,398. PATENTED MAY 19, 1903.
J. M. KINGTON & M. ELLIS.
TAPER ATTACHMENT FOR LATHES.
APPLICATION FILED SEPT. 25, 1901.
NO MODEL. 3 SHEETS—SHEET 1.
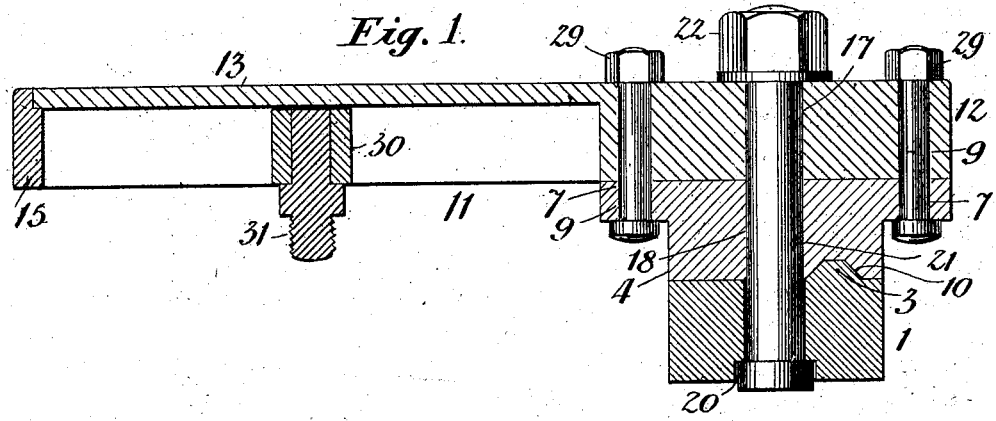
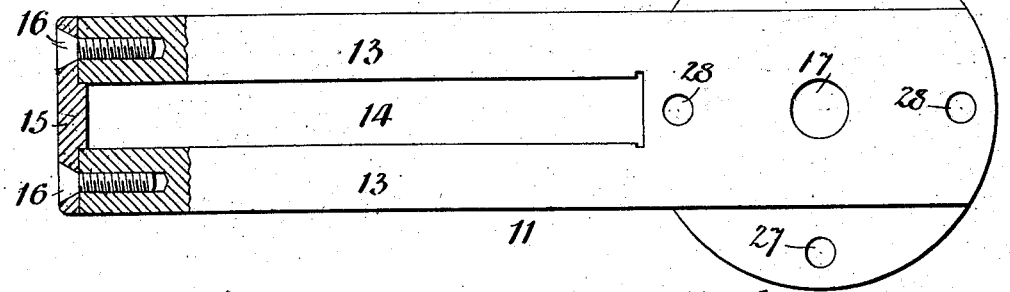
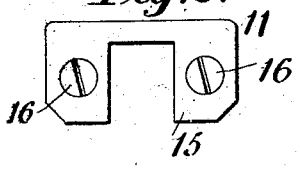
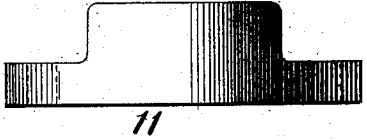
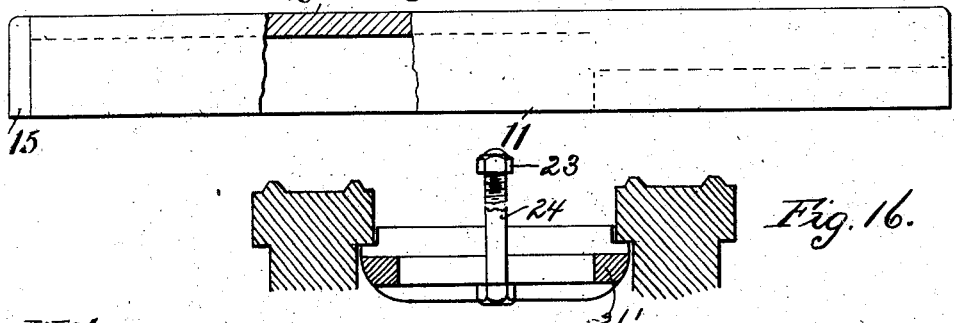
Witnesses:
Arthur Truman Tite
Thomas Milton Harvey
Inventor:
James Monroe Kington
Marvin Ellis

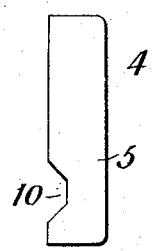
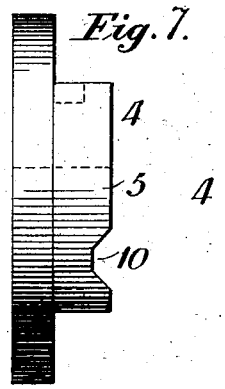
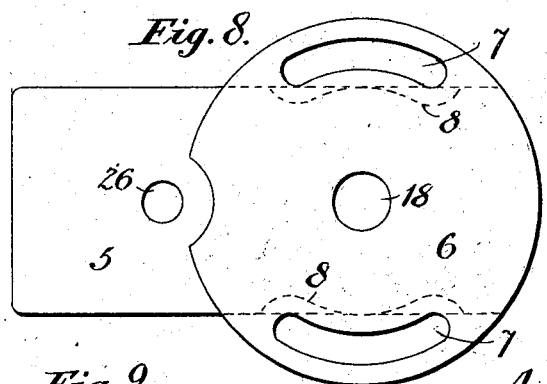
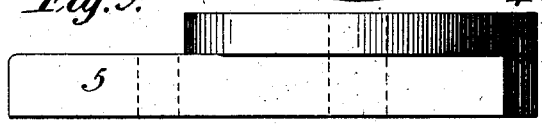
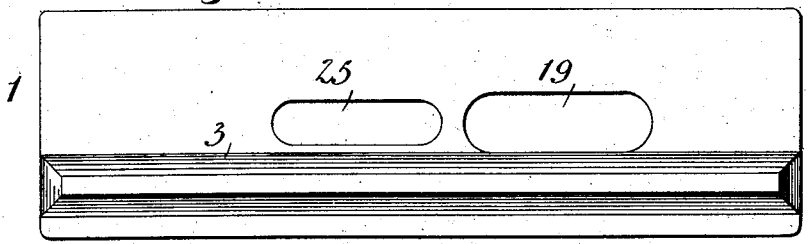
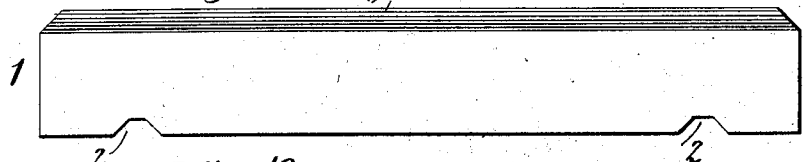
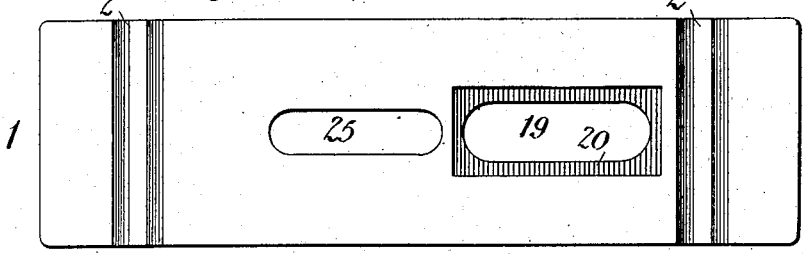
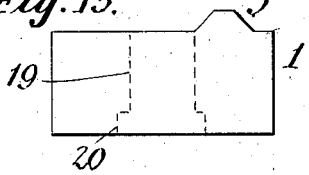

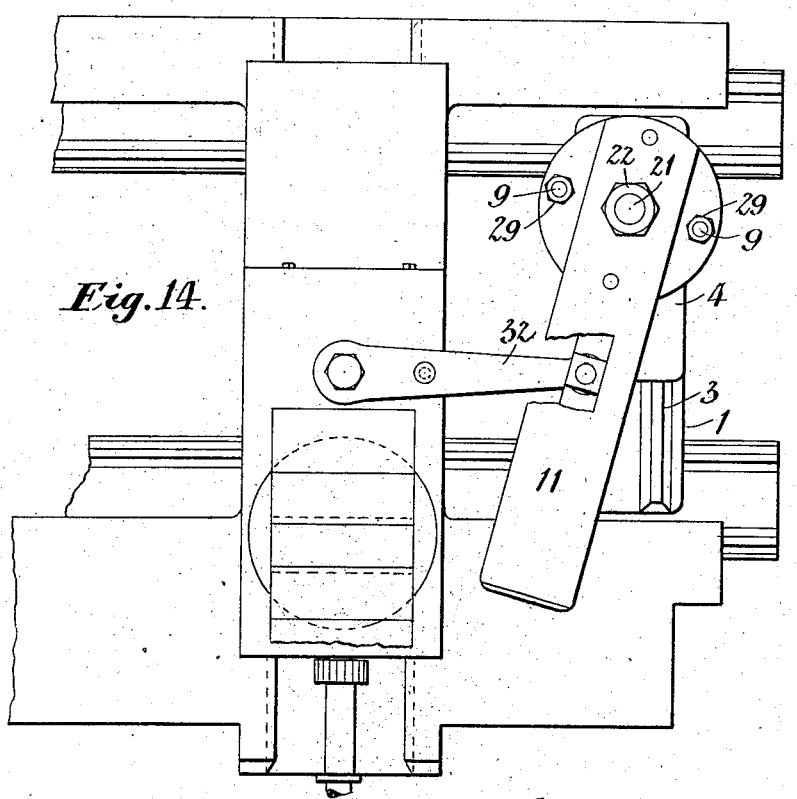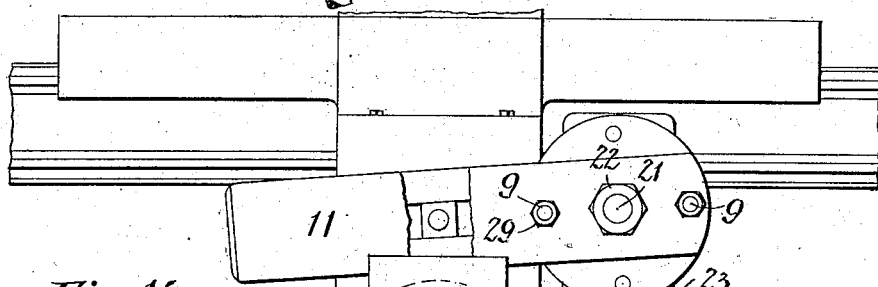

No. 728,398. Patented May 19, 1903.

UNITED STATES PATENT OFFICE.

JAMES MONROE KINGTON AND MARVIN ELLIS, OF NEW DECATUR, ALABAMA.

TAPER ATTACHMENT FOR LATHES.

SPECIFICATION forming part of Letters Patent No. 728,398, dated May 19, 1903.

Application filed September 25, 1901. Serial No. 76,578. (No model.)

*To all whom it may concern:*

Be it known that we, JAMES MONROE KINGTON and MARVIN ELLIS, citizens of the United States, and residents of New Decatur, in the county of Morgan and State of Alabama, have invented a new and useful Universal and Independent Taper Attachment for Lathes, of which the following is a specification.

This invention relates to turning-lathes, and contemplates an improved taper attachment constructed to be readily attached to and detached from the lathe and by which the work of cross and long turning may be effectively performed.

The nature of the invention will be readily comprehended, reference being had to the following detailed description and to the accompanying drawings, in which—

Figure 1 is a vertical longitudinal sectional view of the attachment. Fig. 2 is a bottom plan view, partly in section, of the top piece of the attachment. Fig. 3 is a view of one end, and Fig. 4 a view of the other end; and Fig. 5 is a side elevation, partly in section, of said top piece. Fig. 6 is an end view of the center piece of the attachment. Fig. 7 is a view of the opposite end of the same. Figs. 8 and 9 are respectively plan and side views of said center piece. Fig. 10 is a top plan view of the bottom piece of the attachment. Figs. 11, 12, and 13 are respectively side, bottom plan, and end views of the same. Fig. 14 is a plan view of the attachment mounted on a lathe and adjusted for cross-work. Fig. 15 is a similar view with the attachment adjusted for long work. Fig. 16 is a detail sectional view showing the means employed for clamping the bottom piece to the lathe-bed.

Referring to the drawings by numerals, 1 denotes the bottom piece of the attachment, which is provided in its under side with transversely-disposed V-grooves 2 2, fitting in practice the inside V-ways of the lathe-bed. The bottom piece is adjustable along the bed, and clamping means, presently to be described, are provided to secure it in the desired position. On the top of the bottom piece is a V-way 3, disposed longitudinally and near one side of the bottom piece. The center piece 4 consists of a lower rectangular portion 5 and an upper circular portion or disk 6, which extends beyond the sides of the lower portion and is provided in such extensions with concentrically-curved slots 7 7. The sides of the lower portion adjacent to said slots are cut away, as shown at 8 8, Fig. 8, to accommodate the heads of bolts 9 9, presently to be referred to, and which bolts occupy said slots. The lower portion 5 extends at one end beyond the upper portion 6, and in the under side is a V-groove 10, disposed longitudinally and engaged by the V-way 3 on the bottom piece.

The taper bar 11 consists of a disk portion 12 and an arm 13, integral therewith and extending therefrom and in the under side of which is a longitudinal groove 14. At the outer end of the arm is a strengthening-plate 15, secured by screws 16 16. Centrally of the disk portion 12 is a circular hole 17, which registers with a hole 18 on the center piece and with an elongated opening or slot 19 in the bottom piece. A square recess 20 in the bottom piece receives the head of a bolt 21, which is passed through the slot 19 and holes 18 and 17, and 22 is a nut which is screwed on the upper end of the bolt. The provision of the slot 19 allows adjustment of the taper bar and center piece along the length of the bottom piece or crosswise of the lathe-bed, the adjusted position being maintained by tightening the nut 22 and also a nut 23 on a bolt 24, which is passed through a slot 25 in the bottom piece and through a hole 26 in the center piece. The lower headed end of the bolt 24 occupies a slot in a clamping-piece 26', which latter with the bolt 24 serve to clamp the bottom piece to the lathe-bed, as shown in Fig. 16. The taper bar is radially adjustable on the center piece. The bolt 21 serves as the pivot for the taper bar, permitting the latter to be adjusted at any desired angle transversely of the lathe-bed, as shown in Fig. 14, or at any desired angle longitudinally of the lathe-bed, as shown in Fig. 15. Bolts 9 9, previously referred to, serve as the means for maintaining the adjustment, the bolts being passed through the slots 7 in the center piece and through holes 27 27 in the taper bar for cross-work or through holes 28 28 in said taper bar for long work. The slots 7 permit the necessary range of angular adjustment of the taper bar, the adjustment being maintained by nuts 29 29 on the bolts 9 9. A block 30 slides in the groove 14, and to the block is secured by a bolt 31 the tool-slide connection 32.

We claim as our invention—

A taper attachment for lathes consisting of a bottom piece having in its under side V-grooves for slidable engagement with the V-ways of a lathe-bed said bottom piece being arranged transversely of said bed and having means to secure it in adjusted position along said V-ways, a center piece having groove-and-way connection with the bottom piece to slide thereon, means for securing the center piece in adjusted position on the bottom piece, a taper bar angularly adjustable on a center bolt on the center piece, and means for maintaining the angular adjustment of the taper bar.

In testimony whereof we have signed our names to this specification in the presence of two subscribing witnesses.

JAMES MONROE KINGTON.
MARVIN ELLIS.

Witnesses:
TENNYSON TIDWELL,
HIRAM MADISON YOUNG.